United States Patent [19]

Labaziewicz

[11] Patent Number: 5,333,024
[45] Date of Patent: Jul. 26, 1994

[54] OPTICAL APPARATUS FOR CHANGING FOCUS AND FOCAL LENGTH

[75] Inventor: Peter Labaziewicz, Rochester, N.Y.

[73] Assignee: Eastman Kodak Company, Rochester, N.Y.

[21] Appl. No.: 24,033

[22] Filed: Mar. 1, 1993

[51] Int. Cl.⁵ .................................................. G03B 1/18
[52] U.S. Cl. .................................................. 354/195.12
[58] Field of Search ............ 354/195.1, 195.11, 195.12

[56] References Cited

U.S. PATENT DOCUMENTS

| | | | |
|---|---|---|---|
| 1,988,367 | 1/1935 | Wenczler | 88/24 |
| 3,051,048 | 8/1962 | Mahn | 88/57 |
| 4,391,496 | 7/1983 | Schilling et al. | 350/519 |
| 4,593,987 | 6/1986 | Takahashi et al. | 354/402 |
| 4,757,372 | 7/1988 | Betensky et al. | 354/201 |
| 4,887,109 | 12/1989 | Fujita et al. | 354/222 |
| 4,894,672 | 1/1990 | Tanka | 354/195.12 |
| 4,958,178 | 9/1990 | Toshida et al. | 354/195.12 |
| 4,971,427 | 11/1990 | Takamura et al. | 350/429 |
| 4,980,711 | 12/1990 | Komatsuzaki et al. | 354/195.1 |
| 5,005,038 | 4/1991 | Ogawa et al. | 354/400 |
| 5,043,752 | 8/1991 | Kohmoto | 354/195.12 |
| 5,146,254 | 9/1992 | Tsurukawa et al. | 354/195.12 |
| 5,181,144 | 1/1993 | Shirie et al. | 359/700 |

*Primary Examiner*—Michael L. Gellner
*Assistant Examiner*—Nicholas J. Tuccillo
*Attorney, Agent, or Firm*—David A. Howley

[57] ABSTRACT

Optical apparatus having first and second lens groups moveable along an optical axis, and a cam and follower mechanism for communicating relative axial displacement to the second lens group in response to axial movement of the first lens group for changing the focal length of the optical system. The cam and follower mechanism is characterized by a plurality of cam steps each having first or dwell surfaces for maintaining the relative axial displacement constant in response to axial movement of the first lens group, to accommodate focusing between at least two focus positions at a fixed focal length, and second or ramp surfaces for changing the relative axial displacement in response to axial movement of the first lens group, for changing the focal length of the apparatus.

9 Claims, 4 Drawing Sheets

OPTICAL APPARATUS FOR CHANGING FOCUS AND FOCAL LENGTH

CROSS-REFERENCE TO RELATED APPLICATION

Reference is made to commonly assigned U.S. patent application Ser. No. 08/024,132, filed concurrently herewith in the names of William L. Burnam and Ralph M. Lyon and Michael J. Poccia, and entitled "CONTROL FOR OPTICAL SYSTEM HAVING MULTIPLE FOCAL LENGTHS."

FIELD OF INVENTION

The present invention relates to the field of photography and is directed to optical apparatus for varying the focal length and adjusting the focus of a multi-focal lens system.

BACKGROUND OF THE INVENTION

Modern cameras frequently include optical systems, sometimes called zoom lenses, having multiple or infinitely variable focal lengths ranging from wide-angle to telephoto. It is common in such optical systems to include lens groups that are moveable relative to each other along the optical axis to change the focal length of the system. When the focal length is changed, it is desirable at the same time to maintain focus throughout the entire range of focal lengths. This adjustment usually is accomplished by moving the optical elements relative to the film or other imaging plane.

There are many techniques for controlling the movement of optical elements in a zoom lens system to maintain focus while also providing for multiple or infinitely variable focal lengths. One such technique is illustrated in U.S. Pat. No. 4,971,427, filed in the name of Takamara et al. and issued Nov. 20, 1990. The Takamara et al. patent discloses a camera having front and back lens groups and a bell crank coupled therebetween to vary the inter-group spacing and thereby change the focal length. Both lens groups are retained in a lens barrel that is movable along an optical axis relative to the film plane. Movement of the lens barrel causes the bell crank to engage and follow a cam plate that rotates the bell crank and shifts the back lens group along the optical axis relative to the front lens group.

Another technique is disclosed in U.S. Pat. No. 4,391,496, filed in the name of Schilling et al. and issued Jul. 5, 1983. According to the Shilling disclosure, an elbow linkage couples first and second lens groups in a pancratic objective system. The linkage includes a cam follower at the elbow for engaging and following a cam surface so that axial movement of the first lens group extends or contracts the linkage, changing the distance between the lens groups and the system focal length.

PROBLEM TO BE SOLVED BY THE INVENTION

Optical systems that simultaneously change the focus and focal length, and particularly zoom lenses that include a cam and follower mechanism, such as those described above, are particularly sensitive to design and manufacturing tolerances. Axial movement of the lens groups, intended to focus the system, simultaneously is translated by the cam and follower mechanism into relative displacement of the lens groups, changing the focal length. In automated cameras that include switches and motors for driving the focusing mechanism, relatively precise alignment and tolerances are required, not only in the cam and follower mechanism, but throughout the position sensing and switching actuators.

In addition to precision requirements, prior art mechanisms frequently are complicated and typically provide for only one focus position at each discrete focal length, either increasing cost or reducing flexibility.

SUMMARY OF THE INVENTION

The present invention is directed to apparatus having first and second lens groups moveable along an optical axis, and including a cam and follower mechanism for changing the focal length of the optical system by communicating relative axial displacement to said second lens group in response to axial movement of said first lens group. The cam and follower mechanism is characterized by a plurality of cam steps, each having first means for maintaining said relative axial displacement constant in response to axial movement of said first lens group, and second means for changing said relative axial displacement in response to axial movement of said first lens group.

In accordance with one aspect of the invention, the first means includes a dwell cam surface extending parallel to the optical axis for accommodating axial movement of said first lens group to permit focusing of the optical system between at least two focus positions at a fixed focal length, and the second means includes a ramped cam surface extending at an angle to the optical axis for displacing said second lens group relative to said first lens group in response to axial movement of said first lens group, thereby to change the focal length of the optical system.

According to still another aspect of the invention, the cam and follower mechanism includes a plurality of opposed pairs of cam steps, each pair including dwell cam surfaces extending parallel to each other and the optical axis, and ramped cam surfaces extending at an angle relative to each other and the optical axis.

These and other aspects, objects, features and advantages of the invention will be more clearly understood and appreciated from a review of the following detailed description of the preferred embodiment and appended claims, and be reference to the accompanying drawings.

BRIEF DESCRIPTION OF THE DRAWINGS

The invention and its many advantages will become apparent from the following description taken in connection with the accompanying drawings, wherein.

DESCRIPTION OF THE PREFERRED EMBODIMENT

The invention is disclosed in connection with a conventional photographic still camera. Because such cameras are well known, this description is directed in particular to elements forming part of or cooperating directly with the disclosed embodiment.

Figure 1:
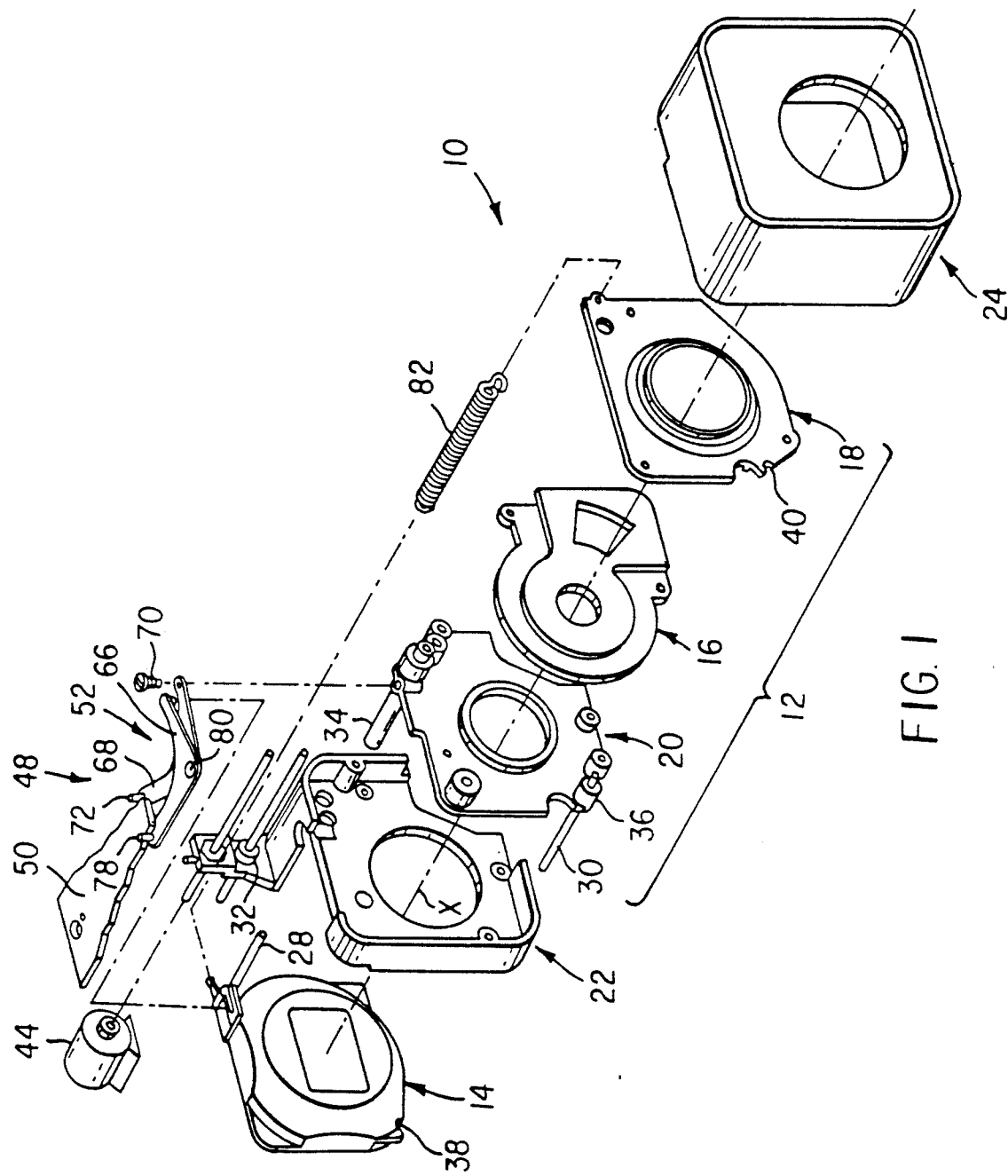
FIG. 1 is an exploded view of a zoom lens system depicting first and second lens groups coupled by a cam and follower mechanism in accordance with the present invention.
Figure 2:
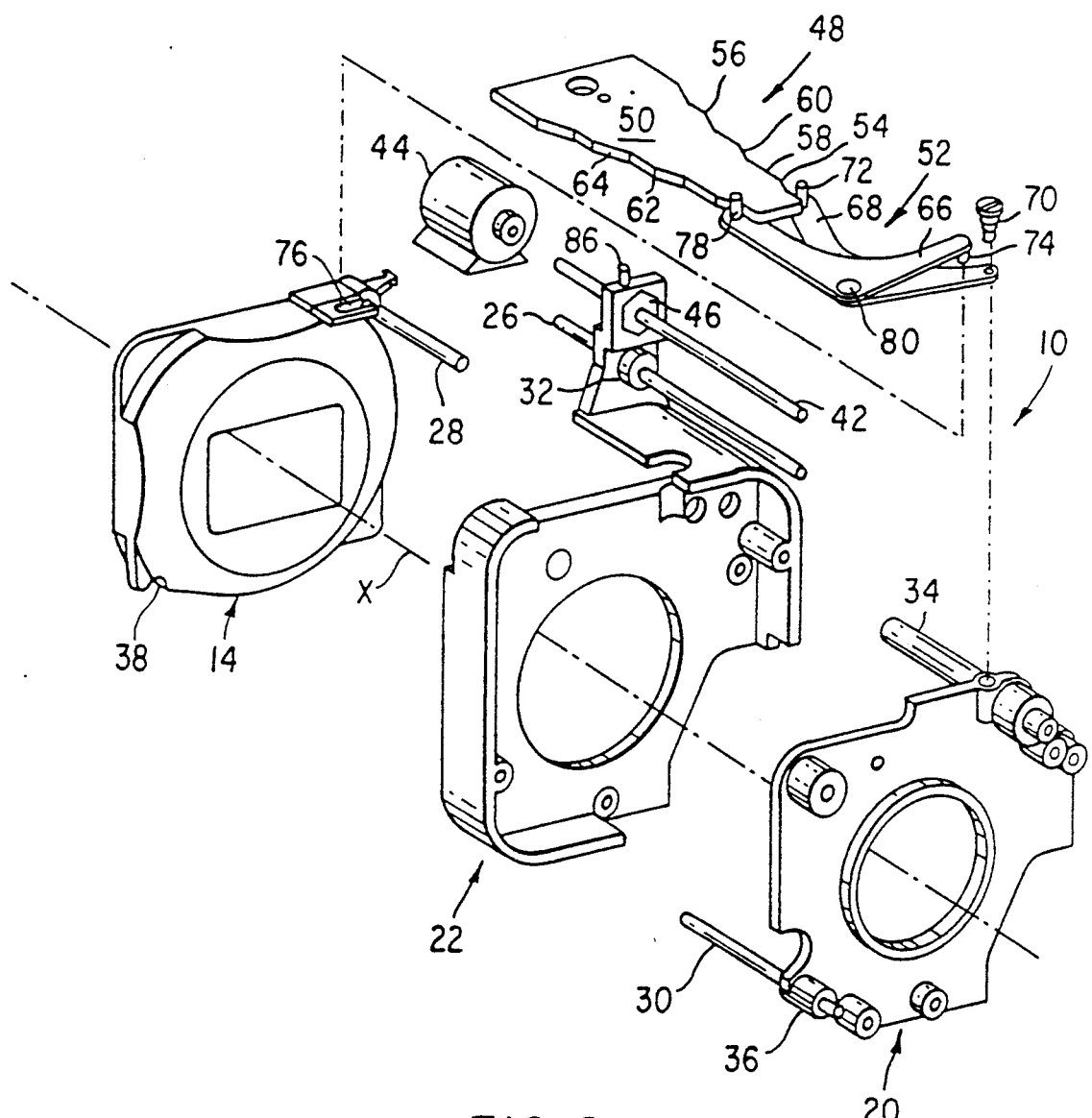
FIG. 2 is an exploded view of a portion of the zoom lens system of FIG. 1 enlarged to more clearly show the first and second lens groups and the cam and follower mechanism.
Figure 3:
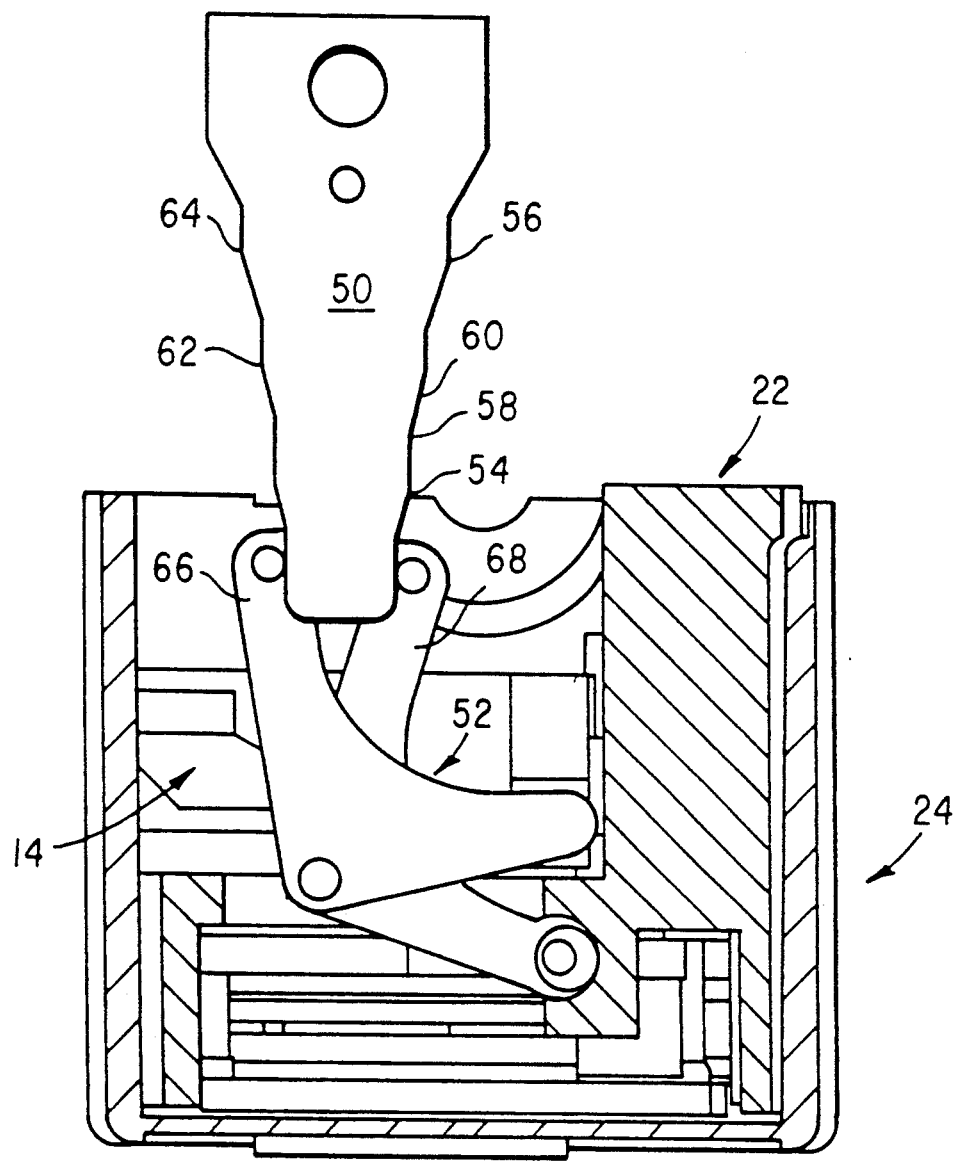
FIG. 3 is a top plan view of the first and second lens groups and the cam and follower mechanism.

Referring now to FIGS. 1 and 2, an optical system in the form of a zoom lens 10 is depicted including first or front and second or back lens groups 12 and 14, respectively, disposed for relative movement along an optical axis X. The front lens group 12 includes a shutter assembly 16, of conventional design, a front lens retainer 18 and a rear lens retainer 20, which are all assembled within a lens housing 22 and lens cover or barrel 24 to move as a group along the optical axis. It will be obvious to one skilled in the art that the first and second lens groups 12 and 14 can include any number of appropriate combinations of lens elements interposed with shutter and other assemblies suitable for photographic exposures. It also will be apparent that other stationary and moveable groups of optical and related elements can be provided in cooperation with the first and second groups 12 and 14 along the same optical axis.

The first and second lens groups are maintained in alignment perpendicular to the film plane, are prevented from rotating, and are mounted for lengthwise movement along the optical axis by a plurality of parallel guide rods and anti-rotation shafts 26, 28, and 30. Main shaft 26 is secured to the camera body (not shown), and extends through a bushing 32 in housing 22 for aligning the first lens group 12 relative to the camera body and film plane (not shown). Shaft 28 extends from the second lens group 14 through an aperture in housing 22 and into a sleeve 34 in the first lens group 12 for maintaining proper alignment of the second lens group 14 relative to the first lens group 12. Shaft 30 extends from a boss 36 in the first lens group 12 through the housing 22 and against a notch 38 in the second lens group 14 to prevent rotation of the second lens group 14 relative to the first lens group 12. The end of the anti-rotation shaft adjacent retainer 18 is accommodated by a notch 40 in the retainer.

Longitudinal movement of the first lens group 12 along the optical axis X is provided through a drive shaft 42 under control of a motor 44. The drive shaft is coupled to housing 22 through a threaded nut 46 that translates rotary movement of the drive shaft into longitudinal movement of the housing and the first lens group assembled therewith. The second lens group 14, on the other hand, except for the control mechanism described hereinafter, is moveable independently of the first lens group along shafts 28 and 30.

The focus adjustment and focal length selection for the optical system are varied by a control device 48 which extends between and is coupled to the first and second lens groups 12 and 14. The control device includes a cam and cam follower mechanism 50 and 52, respectively, for changing the focal length of the optical system by communicating relative axial displacement to said second lens group in response to axial movement of said first lens group. The cam and follower mechanism includes a plurality of cam steps depicted at 54, and 56, each having a dwell cam surface 58 extending parallel to the optical axis, and a ramped cam surface 60, extending at an angle to the optical axis. The dwell cam surface accommodates axial movement of said first lens group without changing the relative displacement between the lens groups and thereby permits focusing of the optical system between at least two focus positions at a fixed focal length. The ramped cam surface displaces said second lens group relative to said first lens group in response to movement of said first lens group along the optical axis, and thereby changes the focal length of the optical system.

According to the preferred embodiment of the invention, the cam and follower mechanism also includes a second plurality of cam steps 62 and 64 that are essentially mirror images of the steps 54 and 56 to define opposed pairs of cam steps, where each pair includes dwell cam surfaces that extend parallel to each other and to the optical axis, and ramped cam surfaces that extend at an angle relative to each other and the optical axis.

Referring now in more detail to the elements that make up the cam and follower mechanism, the cam follower 52 includes first and second linkages in the form of L-shaped members 66 and 68. The second L-shaped member 68 includes one end pivotally coupled to the front lens group 12 through a pin 70, and another end having a cam follower in the form of a pin 72. The first L-shaped member 66 has one end coupled to the second lens group 14 through a pin 74 and slot 76 (FIG. 2), permitting translational movement there between. Another end of first L-shaped member 66 includes a cam follower in the form of a pin 78. The first and second L-shaped members form a scissors linkage coupled in their center sections by a floating pivot 80.

The cam followers 72 and 78 are urged under the influence of spring 82 (FIG. 1) into engagement with the opposed cam surfaces of cam 50 for controlling a number of important optical functions. These functions will be described in connection with the operation of the cam and follower mechanism which follows.

The focal length is set first by selective operation of motor 44 to rotate drive shaft 42, operating through nut 46, to translate the rotary motion of the drive shaft into movement of the first lens group along optical axis X. During this initial travel of the first lens group, the first and second cam followers 72 and 78 are ramped apart by divergent cam surfaces that are angled away from each other and relative to the optical axis. This ramping movement spreads the cam followers and pivots the scissors linkage 66 and 68 apart, thereby displacing the second lens group relative to the first lens group. Both groups move along the same axis, but by a different amount, thereby changing the focal length. After selection of a discrete a focal length, the focus can then be adjusted using the very same motor, drive shaft and mechanism to shift the first lens group so cam followers 72 and 78 transverse the cam sections that are parallel to each other and the optical axis. Such movement does not change the separating of the cam followers or the relative displacement between the first and second lens groups and, therefor, does not change the focal length of the optical system. It does, however, change its focus, permitting two or more focus settings for each discrete focal length. Such a cam and follower mechanism can be utilized to accomplish a number of different valuable objectives. Some are described hereinafter, and still others will be apparent from this description to those skilled in the art.

Figure 4:
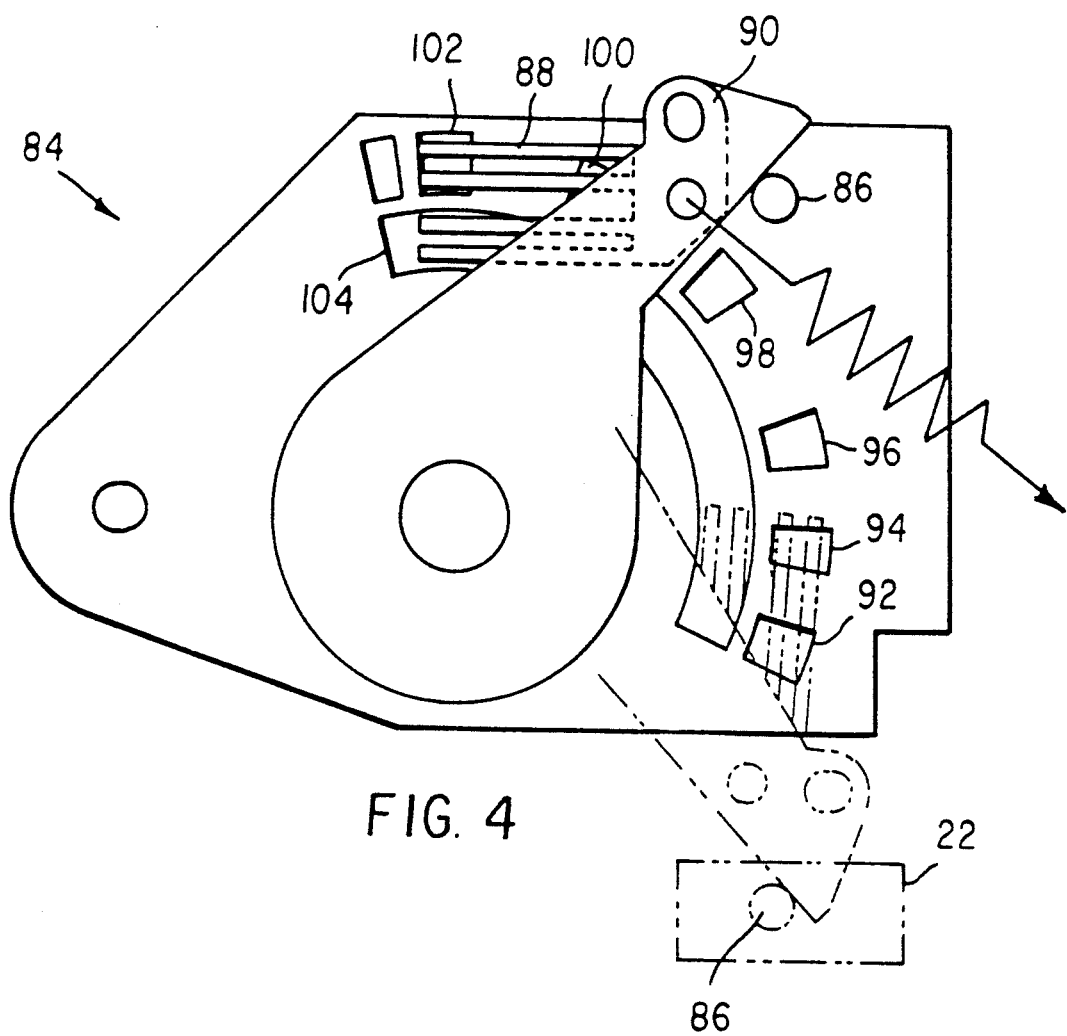
FIG. 4 is a bottom plan view of a switch control assembly for use with the present invention depicting a position switch in a wide-angle position and, in phantom, a telephoto position.

Referring now to FIG. 4, a switch control assembly 84 is depicted for use with the present invention to sense and control the relative position of the first lens group 12 as it moves between a wide-angle position, depicted in solid lines in FIG. 4, and a telephoto position, depicted in phantom in FIG. 4. A pin 86, carried by housing 22 moves with the first lens group 12 during changes in its position along optical axis X. During such movement the pin engages and sweeps contacts 88, on pivotal arm 90, across a plurality of switch pads 92, 94, 96, 98, 100, and 102, for establishing electrical connections between such switch pads and a grounding strip 104. Each switch pad represents a desired position along the optical axis of the first lens group and cooperates with appropriate electrical mechanisms in the camera body (not shown) and motor 44 to establish the first lens group in each desired position. The dimensions of the respective pads also can be chosen in cooperation with the dwell and ramp surfaces 58 and 60 of the cam and follower mechanism 48 and 50 to facilitate the operation already described.

In accordance with one feature of the invention, the above-described embodiment can be used with a simple switch (not shown) for setting close-up and distance focus settings. When in the close-up setting, the apparatus will drive the first lens group to a position at each discrete focal length that is suitable for close-up pictures. When in the distance setting, on the other hand, the apparatus will drive the first lens group to a different position, at each discrete focal length, that is suitable for distance pictures. In accordance with another feature of the invention, an auto-focus device can be substituted for the manual switch to employ the same cam and follower mechanism to focus the camera. The focal length is selected first, and then the auto-focus device can be actuated to use the dwell cam surface to change focus without altering the focal length. In accordance with still another feature, a cam and follower mechanism in accordance with the invention can be used to permit relaxation of manufacturing tolerances and specifications. Somewhat imprecise location of the first lens group would still result in relatively precise selection of a discrete focal length. The simplicity of a cam and follower arrangement would be retained while removing the prior art requirement of relatively precise tolerances.

It should be evident from the foregoing description that certain aspects of the invention are not limited to the particular details of the examples illustrated, and it is therefore contemplated that other modifications and applications will occur to those skilled in the art without departing from the invention. It is accordingly intended that the claims shall cover all such modifications and applications as do not depart from the true spirit and scope of the invention.

What is claimed is:

1. Apparatus having first and second lens groups moveable along an optical axis, and a cam and follower mechanism for communicating relative axial displacement to said second lens group in response to axial movement of said first lens group for changing the focal length of the optical system; characterized in that:
said cam and follower mechanism includes a plurality of cam steps each having first means for maintaining said relative axial displacement constant in response to axial movement of said first lens group, and second means for changing said relative axial displacement in response to axial movement of said first lens group.

2. Apparatus as defined in claim 1, wherein said first means includes a dwell cam surface extending parallel to said optical axis for accommodating axial movement of said first lens group to permit focusing of the optical system between at least two focus positions at a fixed focal length.

3. Apparatus as defined in claim 2, wherein said second means includes a ramped cam surface extending at an angle to said optical axis for displacing said second lens group relative to said first lens group in response to movement of said first lens group along said optical axis, thereby to change the focal length of the optical system.

4. Apparatus as defined in claim 1, wherein said cam and follower mechanism includes a plurality of opposed pairs of cam steps, each pair including dwell cam surfaces extending parallel to each other and the optical axis and ramped cam surfaces extending at an angle relative to each other and the optical axis.

5. Apparatus as defined in claim 4, wherein said cam and follower mechanism includes scissors linkages having a first link extending between and coupled to said first lens group and one of said opposed pairs of cam steps, and a second link extending between and coupled to said second lens group and the other of said opposed pairs of cam steps, and a floating pivot connecting said first and second links in a center section thereof.

6. Apparatus for varying a focal length of a zoom lens system having first and second lens groups moveable along an optical axis, said apparatus comprising cam means for communicating motion to said first and second lens groups and cam follower means coupled with said first and second lens groups for engaging said cam means; characterized in that:
said cam means includes a plurality of cam surfaces arranged in a stepwise fashion connected by slant surfaces, each of said cam surfaces defining a discrete focal length for the zoom lens system, said focal lengths ranging from relatively long to relatively short focal lengths, said cam surfaces maintaining a relative axial displacement of said first and second lens groups constant in response to axial movement of said first lens group; and
said apparatus includes means for moving one of said lens groups to cause said cam follower means to engage a selected one of said plurality of cam surfaces to fix the focal length of the zoom lens system at one of said discrete focal lengths.

7. Apparatus as defined in claim 6, wherein said cam means extends generally parallel to said optical axis and includes a plurality of pairs of cam surfaces, each of said pair of cam surfaces defining a discrete focal length for the zoom lens system.

8. Apparatus as defined in claim 6, wherein said each of said plurality of cam surfaces includes dwell means for accommodating movement of said cam follower means along said cam surface to permit focusing of the zoom lens system between at least two focus positions.

9. Apparatus as defined in claim 7, wherein said each of said plurality of pairs of cam surfaces includes dwell means for accommodating movement of said cam follower means along said cam surfaces to permit focusing of the zoom lens system between at least two focus positions.

* * * * *